United States Patent
Li et al.

(10) Patent No.: US 12,118,737 B2
(45) Date of Patent: Oct. 15, 2024

(54) IMAGE PROCESSING METHOD, DEVICE AND COMPUTER-READABLE STORAGE MEDIUM

(71) Applicant: NEC CORPORATION, Tokyo (JP)

(72) Inventors: Yan Li, Beijing (CN); Ni Zhang, Beijing (CN)

(73) Assignee: NEC CORPORATION, Tokyo (JP)

( * ) Notice: Subject to any disclaimer, the term of this patent is extended or adjusted under 35 U.S.C. 154(b) by 435 days.

(21) Appl. No.: 17/645,611

(22) Filed: Dec. 22, 2021

(65) Prior Publication Data
US 2022/0198693 A1 Jun. 23, 2022

(30) Foreign Application Priority Data
Dec. 23, 2020 (CN) .......................... 202011545921.8

(51) Int. Cl.
*G06K 9/00* (2022.01)
*G06T 7/55* (2017.01)
*G06T 7/70* (2017.01)

(52) U.S. Cl.
CPC .................. *G06T 7/55* (2017.01); *G06T 7/70* (2017.01); *G06T 2207/10068* (2013.01); *G06T 2207/20081* (2013.01)

(58) Field of Classification Search
CPC ... G06T 7/55; G06T 7/70; G06T 2207/10068; G06T 2207/20081; G06T 2207/20084; G06T 7/579; G06T 2207/10016; G06T 17/00; G06T 7/593; G06T 19/003; G06T 2207/10028; G06T 3/02
See application file for complete search history.

(56) References Cited

U.S. PATENT DOCUMENTS

2020/0195910 A1  6/2020  Han et al.

FOREIGN PATENT DOCUMENTS

| CN | 110610486 A | * | 12/2019 | ........... G06T 7/0002 |
|----|-------------|---|---------|------------------------|
| CN | 111145238 A | * | 5/2020  | ............. G06T 5/006 |
| CN | 111784757 A | * | 10/2020 | ............. G06N 3/045 |
| CN | 112037150 A |   | 12/2020 | |
| JP | 2019-87229 A |  | 6/2019  | |
| JP | 2020-123114 A | | 8/2020  | |

OTHER PUBLICATIONS

Office Action dated Feb. 14, 2023 from the Japanese Patent Office in JP Application No. 2021-208765.

* cited by examiner

*Primary Examiner* — Xin Jia
(74) *Attorney, Agent, or Firm* — Sughrue Mion, PLLC

(57) ABSTRACT

Embodiments of the present disclosure relate to an image processing method, a device and a computer-readable storage medium. The method includes obtaining a first reference image and a second reference image of a reference object. The method further includes determining a first constraint and a second constraint based on the first reference image and the second reference image. The first constraint is related to a difference between different depth maps of the same reference images, and the second constraint is related to a depth consistency of different reference images. The method further includes training a depth estimation model at least based on the first constraint and the second constraint. In this way, an obtained trained depth estimation model may provide more accurate depth information.

17 Claims, 9 Drawing Sheets

IMAGE PROCESSING METHOD, DEVICE AND COMPUTER-READABLE STORAGE MEDIUM

FIELD

Embodiments of the present disclosure relate to the field of image processing, and more specifically, to an image processing method, a device and a computer-readable storage medium.

BACKGROUND

In many scenarios, it is common to use a single camera without depth to image an object of interest. For example, in the medical field, a monocular endoscope is used for imaging internal organs (such as the stomach) of a patient, so as to determine a lesion or perform surgery. As another example, in the field of gaming and leisure, the camera of a terminal device is used for imaging a user, so as to track the limbs of the user.

An image obtained in this way has no depth information. Therefore, various methods have been proposed to obtain the depth information of the object of interest from multiple images or to reconstruct a three-dimensional (3D) image of the object of interest. However, the accuracy of the obtained depth information or the reconstructed 3D image needs to be improved.

SUMMARY

The embodiments of the present disclosure provide an image processing method, a device and a computer-readable storage medium.

In a first aspect of the present disclosure, an image processing method is provided. The method includes: obtaining a first reference image and a second reference image of a reference object, the first reference image and the second reference image being captured by a reference camera at different positions relative to the reference object; determining a first loss and a second loss based on the first reference image and the second reference image, the first loss being related to a difference between different depth maps of the same reference images, and the second loss being related to a depth consistency of different reference images; and training a depth estimation model at least based on the first loss and the second loss, to obtain the trained depth estimation model.

In a second aspect of the present disclosure, an image processing method is provided. The method includes: obtaining a sequence of target images of a target object, the sequence of target images being captured by a target camera at different positions relative to the target object; and generating a depth map corresponding to at least one target image in the sequence of target images, using a depth estimation model which is trained according to the method of the first aspect.

In a third aspect of the present disclosure, an electronic device is provided. The electronic device includes at least one processing circuit. The at least one processing circuit is configured to: obtain a first reference image and a second reference image of a reference object, the first reference image and the second reference image being captured by a reference camera at different positions relative to the reference object; determine a first loss and a second loss based on the first reference image and the second reference image, the first loss being related to a difference between different depth maps of the same reference images, and the second loss being related to a depth consistency of different reference images; and train a depth estimation model at least based on the first loss and the second loss, to obtain the trained depth estimation model.

In a fourth aspect of the present disclosure, an electronic device is provided. The electronic device includes at least one processing circuit. The at least one processing circuit is configured to: obtain a sequence of target images of a target object, the sequence of target images being captured by a target camera at different positions relative to the target object; and generate a depth map corresponding to at least one target image in the sequence of target images, using a depth estimation model which is trained according to the method of the first aspect.

In a fifth aspect of the present disclosure, a computer-readable storage medium is provided. The computer-readable storage medium has machine-executable instructions stored thereon, and the machine-executable instructions, when executed by a device, causes the device to perform the method described in the first aspect of the present disclosure.

In a sixth aspect of the present disclosure, a computer-readable storage medium is provided. The computer-readable storage medium has machine-executable instructions stored thereon, and the machine-executable instructions, when executed by a device, causes the device to perform the method described in the second aspect of the present disclosure.

The summary of the invention is provided to introduce a series of concepts in a simplified form, which will be further described in the following specific embodiments. The summary of the invention is not intended to identify key features or essential features of the present disclosure, nor is it intended to limit the scope of the present disclosure. Other features of the present disclosure will become understandable through the following description.

DESCRIPTION OF DRAWINGS

From the following disclosure and claims, the purposes, advantages and other features of the present invention will become more apparent. For the purpose of example only, a non-limiting description of preferred embodiments is given with reference to the drawings, in which:

In the various drawings, the same or corresponding reference signs indicate the same or corresponding parts.

DETAILED DESCRIPTION OF EMBODIMENTS

Figure 1A:
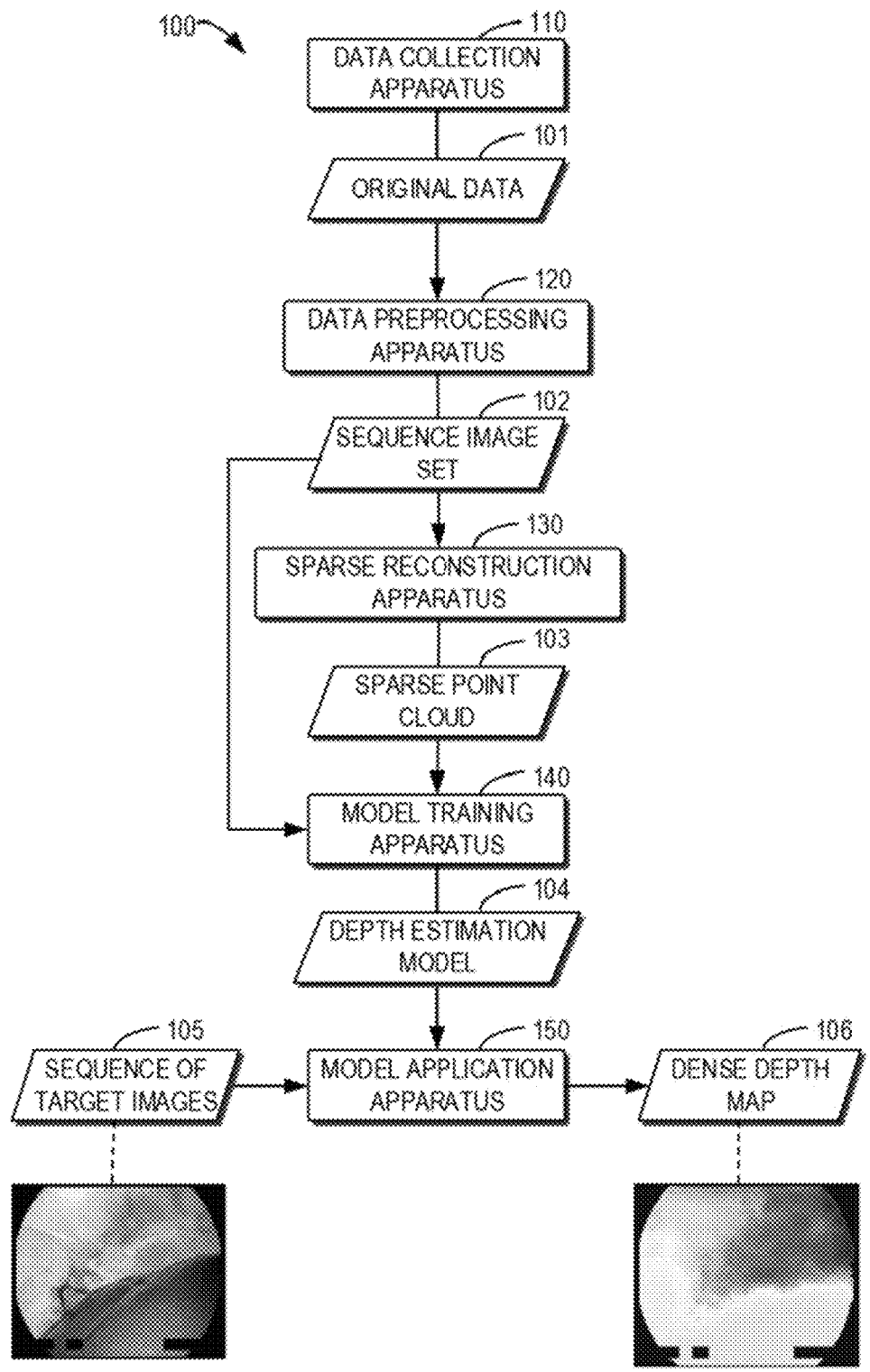
FIG. 1A shows a schematic block diagram of an image processing system according to an embodiment of the present disclosure.

Hereinafter, the embodiments of the present disclosure will be described in more detail with reference to the drawings. Although some embodiments of the present disclosure are shown in the drawings, it should be understood that the present disclosure may be implemented in various forms and should not be construed as being limited to the embodiments set forth herein. On the contrary, these embodiments are provided for a more thorough and complete understanding of the present disclosure. It should be understood that the drawings and embodiments of the present disclosure are only used for exemplary purposes, rather than limiting the protection scope of the present disclosure.

In the description of the embodiments of the present disclosure, the term "including" and similar terms should be understood as open-ended inclusion, i.e. "including but not limited to". The term "based on" should be understood as "at least partially based on". The term "one embodiment" or "the embodiment" should be understood as "at least one embodiment." The terms "first", "second" and the like may refer to different or the same objects. The following description may also include other explicit and implicit definitions.

The term "circuit" as used herein may refer to a hardware circuit and/or a combination of a hardware circuit and software. For example, the circuit may be a combination of an analog and/or digital hardware circuit and software/firmware. As another example, the circuit may be any part of a hardware processor with software, the hardware processor includes (multiple) digital signal processors, software, and (multiple) memories, which work together to enable an apparatus to work to perform various functions. In yet another example, the circuit may be a hardware circuit and/or a processor, such as a microprocessor or a part of a microprocessor, which requires software/firmware for operation, but the software may not exist when it is not needed for operation. As used herein, the term "circuit" also covers the implementation of only the hardware circuit or the processor or a part of the hardware circuit or the processor and its (or their) accompanying software and/or firmware.

In the embodiments of the present disclosure, the term "model" may process an input and provide a corresponding output. Taking a neural network model as an example, it usually includes an input layer, an output layer, and one or more hidden layers between the input layer and the output layer. A model used in a deep learning application (also called "deep learning model") usually includes many hidden layers, thereby extending the depth of the network. The layers of the neural network model are connected in order, so that the output of the previous layer is used as the input of the next layer, wherein the input layer receives the input of the neural network model, and the output of the output layer serves as the final output of the neural network model. Each layer of the neural network model includes one or more nodes (also called processing nodes or neurons), and each node processes the input from the previous layer. In this article, the terms "neural network", "model", "network" and "neural network model" are used interchangeably.

In the embodiments of the present disclosure, the term "dense depth map" may refer to a depth map that has sufficient depth information to reconstruct a complete three-dimensional image of an object. For example, each element in a matrix representing the dense depth map includes depth information. Correspondingly, multiple elements in a matrix representing a sparse depth map may not include depth information.

As mentioned briefly above, in many scenarios, it is common to use a single camera without depth to image an object of interest. Therefore, it is necessary to obtain the depth information of the object of interest or reconstruct a 3D image of the object of interest from multiple images that have no depth information, which is collectively referred to herein as "3D reconstruction of monocular vision".

Taking the medical field as an example, robotic surgery has been widely used. During the robotic surgery, an endoscope integrated with a camera is usually used for providing a surgeon with surgery visualization, so that the doctor may manipulate various surgical tools in the robotic surgery. Due to various limitations, the endoscope is usually only equipped with a single camera, so a captured video of an organ does not have depth information. In this case, it is difficult for the doctor to perceive the depth information only through frames of the video. In addition, some medical robot application programs such as an invasive medical inspection robot may help with inspections and treatments, which requires precise 3D reconstruction and navigation.

This kind of depth estimation of medical images faces many challenges. One challenge is due to poor lighting conditions. Due to a closed structure of a human tissue, the endoscope needs to be equipped with a light source when in use. During inspection or surgery, the light source moves with the endoscope. Due to the movement of the light source, it is impossible to ensure constant luminosity between the frames of the video obtained by the endoscope (hereinafter referred to as an "endoscope video"). Another challenge is due to an image quality problem. Since the endoscope is always moving during the inspection or surgery, there are motion artifacts and blurring in many frames of the endoscope video. In addition, the contrast of the frames of the endoscopic video is usually not high, and the texture is not obvious, this is because human tissues usually have similar textures.

Some solutions have been proposed to perform 3D reconstruction based on medical images or images in other scenarios. For example, with the development of machine learning technology, a solution of using a neural network to predict a dense depth map of an image has been proposed. Due to the lack of a true value for network training, traditional solutions using neural networks are usually unsupervised or self-supervised. Some of these traditional solutions do not consider the impact brought by the movement of the light source, and some other solutions are limited by the accuracy of sparse depth information which is used as the true value in self-training.

The embodiments of the present disclosure propose a solution for image processing, so as to solve one or more of the above-mentioned problems and/or other potential problems. In this solution, a first constraint related to a difference between different depth maps of the same reference images and a second constraint related to a depth consistency of different reference images are used together for training a depth estimation model, so as to realize better supervised training of the depth estimation model. The first constraint may be, for example, a sparse depth loss, and the second constraint may be, for example, a depth consistency loss. The combined use of the first constraint and the second constraint may avoid the problem of excessive smoothness. In this way, the obtained depth estimation model may provide more accurate depth information.

Hereinafter, exemplary embodiments of the present disclosure will be described in detail with reference to the drawings.

Example System

FIG. 1A shows a schematic block diagram of an image processing system 100 according to an embodiment of the present disclosure. As shown in FIG. 1A, the system 100 may include a data collection apparatus 110, a data preprocessing apparatus 120, a sparse reconstruction apparatus 130, a model training apparatus 140, and a model application apparatus 150. In some embodiments, the foregoing multiple apparatuses may be implemented at different physical devices, respectively. Alternatively, at least a part of the foregoing multiple apparatuses may be implemented at the same physical device. For example, the data collection apparatus 110, the data preprocessing apparatus 120, the sparse reconstruction apparatus 130 and the model training apparatus 140 may be implemented at the same physical device, and the model application apparatus 150 may be implemented at another physical device.

The data collection apparatus 110 may collect original data 101. The original data 101 may include image data in any format. The original data 101 may be a video of an object captured by the same camera. During a video capture process, the camera or the object may be in motion. Alternatively, the original data 101 may be a series of static images captured by the same camera at different positions relative to the object.

The data preprocessing apparatus 120 may process the original data 101 to generate a sequence image set 102 for training a model. The sequence image set 102 may include multiple sequences of images. Multiple images in the same sequence may include the same object. The images of different sequences may include the same or different objects. In the case where the original data 101 includes a video, each sequence of images may include multiple frames lasting a predetermined time (for example, 5 seconds). As an example, each sequence of images may include multiple frames in a video of the stomach of a patient which is captured by a monocular endoscope during an inspection or surgery process.

The data preprocessing apparatus 120 may screen the images (for example, the frames or static images of the video) in the original data 101, for example, to remove images whose sharpness does not meet a threshold or whose brightness does not meet a threshold. The data preprocessing apparatus 120 may also group the screened images into multiple sequences of images. Herein, the images in the sequence image set 102 used for training the model may also be referred to as "reference images", and the objects captured by the reference images may also be referred to as "reference objects".

The sequence image set 102 may be provided to the sparse reconstruction apparatus 130. The sparse reconstruction apparatus 130 may generate a sparse point cloud 103 of the reference object based on the sequence image set 102. To this end, the sparse reconstruction apparatus 130 may determine feature matching points from different reference images, and use the feature matching points to reconstruct a sparse depth map, so as to generate the sparse point cloud 103. Hereinafter, an example operation of generating the sparse point cloud 103 by the sparse reconstruction apparatus 130 will be described with reference to FIGS. 2 and 3. Although not shown in FIG. 1A, the sparse reconstruction apparatus 130 may also estimate, based on the sequence image set 102, the posture of the camera that captures the reference images (which may also be referred to as a "reference camera" herein) when capturing each reference image.

The sequence image set 102 and the sparse point cloud 103 may be provided together to the model training apparatus 140 for training the depth estimation model 104. The depth estimation model 104 may be trained to generate a dense depth map of a target object based on different images of the target object. The depth estimation model 104 may be implemented using any suitable network structure, and the scope of the present disclosure is not limited in this respect.

The trained depth estimation model 104 may be provided to the model application apparatus 150. The model application apparatus 150 may obtain a sequence of target images 105 of the target object. The sequence of target images 105 may include multiple images captured by the same camera (which is also referred to herein as a "target camera") at different positions relative to the target object. For example, the sequence of target images 105 may be multiple frames in a video of the stomach of a target patient captured by a monocular endoscope during an inspection or surgery process.

The model application apparatus 150 may use the depth estimation model 104 to generate a dense depth map 106 corresponding to at least one image in the sequence of target images 105. For example, the model application apparatus 150 may generate the dense depth map corresponding to each image in the sequence of target images 105. According to a specific scenario, the dense depth map 106 may be further processed.

In some embodiments, the model application apparatus 150 or other suitable apparatuses may generate a 3D image of the target object based on multiple dense depth maps 106 corresponding to the sequence of target images 105. That is, the dense depth map 106 may be further used for the 3D reconstruction of the target object. In some embodiments, the model application apparatus 150 or other suitable apparatuses may recognize the posture of the target object based on the multiple dense depth maps 106 corresponding to the sequence of target images 105. That is, the dense depth map 106 may be further used for the posture recognition of the target object.

The depth estimation model 104 may be applied to various fields. For example, in the medical field, the depth estimation model 104 may be used for generating the dense depth map of an organ of the patient during the inspection or surgery process of the patient, so as to reconstruct the 3D image of the organ of the patient. The reconstructed 3D image may better assist the doctor in determining the lesion or performing the surgery. As another example, in the field of gaming and leisure, the depth estimation model 104 may be used for generating the dense depth map of a user during an interaction process with the user, so as to recognize the posture of the user. Using the recognized posture, the interest and interactivity may be enhanced. The above descriptions are only examples of the fields in which the depth estimation model 104 may be applied, and are not intended to limit the scope of the present disclosure.

It should be understood that, the system 100 shown in FIG. 1A is only an example in which the embodiments of the present disclosure may be implemented, and is not intended to limit the scope of the present disclosure. The embodiments of the present disclosure are also applicable to other systems or architectures. For example, in some embodiments, the image processing system may not include the data collection apparatus 110, the data preprocessing apparatus 120, and the sparse reconstruction apparatus 130. The model training apparatus 140 may receive from the outside or obtain training data for training the depth estimation model 104 in other suitable ways, such as the sequence image set 102, the sparse point cloud 103, or the sparse depth map corresponding to the reference image in the sequence image set 102.

Figure 1B:
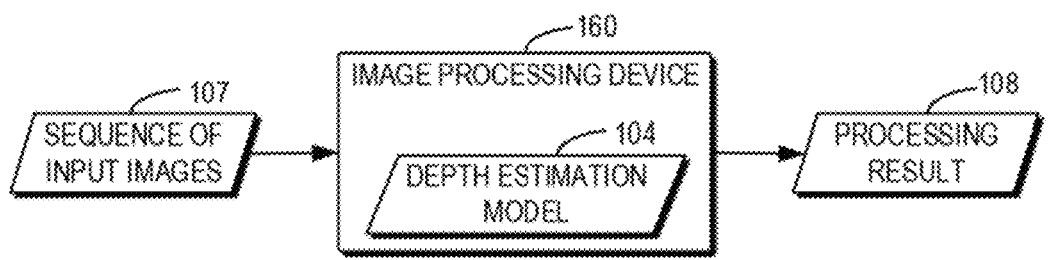
FIG. 1B shows a schematic block diagram of an image processing device according to some embodiments of the present disclosure.

FIG. 1B shows a schematic block diagram of an image processing device 160 according to some embodiments of the present disclosure. The image processing device 160 may include or be deployed with the trained depth estimation model 104. It should be understood that the image processing device 160 may also include or be deployed with other models.

As shown in FIG. 1B, the image processing device 160 may receive a sequence of input images 107. In some embodiments, the sequence of input images 107 may be a series of original images of the target object obtained by an image collection apparatus (for example, the data collection apparatus 110 shown in FIG. 1A). In such an embodiment, the image processing device 160 may perform preprocessing on the sequence of input images 107 to obtain a sequence image set for input to the depth estimation model 104. For example, the image processing device 160 may include the data preprocessing apparatus 120 as shown in FIG. 1A. In some embodiments, the sequence of input images 107 may be a sequence image set of the target object obtained by preprocessing.

The image processing device 160 may generate and provide a processing result 108 on the basis of the sequence of input images 107 and according to the depth estimation model 104. For example, the image processing device 160 may generate multiple dense depth maps of the target object on the basis of the sequence of input images 107 and according to the depth estimation model 104. Then, the image processing device 160 may further process the multiple dense depth maps to generate the processing result 108.

In some embodiments, the image processing device 160 may generate a 3D image of the target object based on the multiple dense depth maps to serve as the processing result 108. That is, in such an embodiment, the image processing device 160 may be a device for 3D reconstruction of the target object. In some embodiments, the image processing device 160 may recognize the posture of the target object based on the multiple dense depth maps. That is, in such an embodiment, the dense depth map 106 may be a device for posture recognition of the target object.

As an example, in the medical field, the image processing device 160 may be a device used in endoscopy or surgery. The sequence of input images 107 may be images of the organ of the patient obtained by the camera deployed on the endoscope. The processing result 108 may be a 3D image of the organ of the patient, which is used by the doctor to determine the lesion or perform the surgery.

The examples of the image processing system and the image processing device according to the embodiments of the present disclosure have been described above. Example operations of some apparatuses are described below in conjunction with FIGS. 2 to 4B.

Example Operation of the Sparse Reconstruction Apparatus

Figure 2:
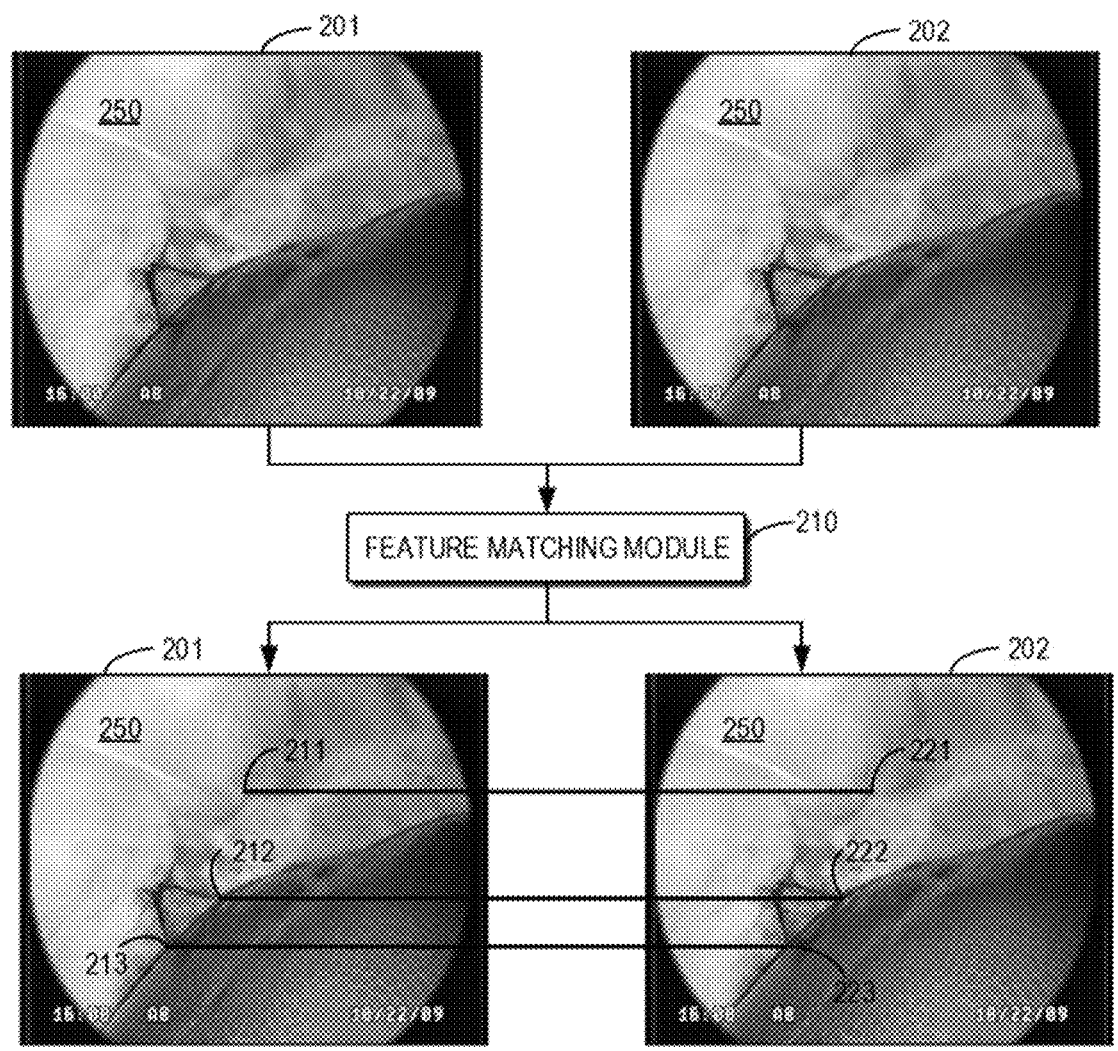
FIG. 2 shows a schematic diagram of feature matching between images according to some embodiments of the present disclosure.

Operations performed by the sparse reconstruction apparatus 130 shown in FIG. 1A will be further described in detail below in conjunction with FIGS. 2 and 3. FIG. 2 shows a reference image 201 and a reference image 202 of a reference object 250 obtained from the sequence image set 102. The reference image 201 and the reference image 202 are captured by a reference camera at different positions relative to the reference object 250. The reference image 201 and the reference image 202 may be two reference images in the same sequence of images. In some embodiments, the reference image 201 and the reference image 202 may be two adjacent frames in a video stream. In some embodiments, the reference image 201 and the reference image 202 may be two frames separated by a predetermined number of frames in the video stream. For example, the reference image 201 may be the ith frame, and the reference image 202 may be the (i+j)th frame, wherein i is a positive integer, and j may be, for example, 2, 3, etc.

Although FIG. 2 only shows that a pair of reference images is obtained from the sequence image set 102 for processing, it should be understood that, this is only for an exemplary purpose, but does not imply any limitation on the scope of the present disclosure. In some embodiments, the sparse reconstruction apparatus 130 may obtain more than two reference images from the sequence image set 102 for processing. In addition, the sparse reconstruction apparatus 130 may sequentially obtain a plurality of pairs of reference images from the sequence image set 102 for processing.

As shown in FIG. 2, the sparse reconstruction apparatus 130 may include a feature matching module 210. The feature matching module 210 may determine, on the basis of image features of the reference image 201 and the reference image 202, a plurality of pairs of pixels in the reference image 201 and the reference image 202. Each pair of pixels may include a first pixel in the reference image 201 and a second pixel in the reference image 202. The first pixel matches with the second pixel according to the image features. Therefore, such a pair of pixels may also be called matched pixels or matched feature points. FIG. 2 schematically shows three pairs of matched pixels, including a first pixel 211 and a second pixel 221, a first pixel 212 and a second pixel 222, and a first pixel 213 and a second pixel 223.

The feature matching module 210 may determine the matched pixels using any suitable feature matching algorithm, such as the maximum stable extreme value region (MSER) and Harries-affine (Harries-Affine). The considered image features may include, but are not limited to, color features, texture features, gradient features, shape features, and so on. The scope of the present disclosure is not limited in this respect. In addition, the number of the matched pixels shown in FIG. 2 is only illustrative. The feature matching module 210 may determine more matched pixels according to the image features.

In some embodiments, the sparse reconstruction apparatus 130 may generate, on the basis of the matched pixels determined through feature matching, the sparse point cloud 103 of the reference object 250. For example, the sparse reconstruction apparatus 130 may generate data related to the sparse depth map on the basis of the matched pixels. Then, the sparse reconstruction apparatus 130 may use a structure from motion (SfM) to construct the sparse point cloud 103 by means of the matched pixels. The constructed sparse point cloud 103 may include multiple points corresponding to a plurality of pairs of pixels, respectively. In addition to the sparse point cloud 103, the sparse reconstruction apparatus 130 may also estimate the postures of the reference camera in capturing the reference image 201 and the reference image 202. Alternatively, the sparse point cloud 103 may also be constructed using any suitable method, such as simultaneous localization and mapping (SLAM).

In some embodiments, the sparse reconstruction apparatus 130 may expand the matched pixels determined through feature matching, so as to determine more matched pixels in the reference image 201 and the reference image 202. For example, the sparse reconstruction apparatus 130 may determine more matched pixels using a local region expansion algorithm.

Figure 3:
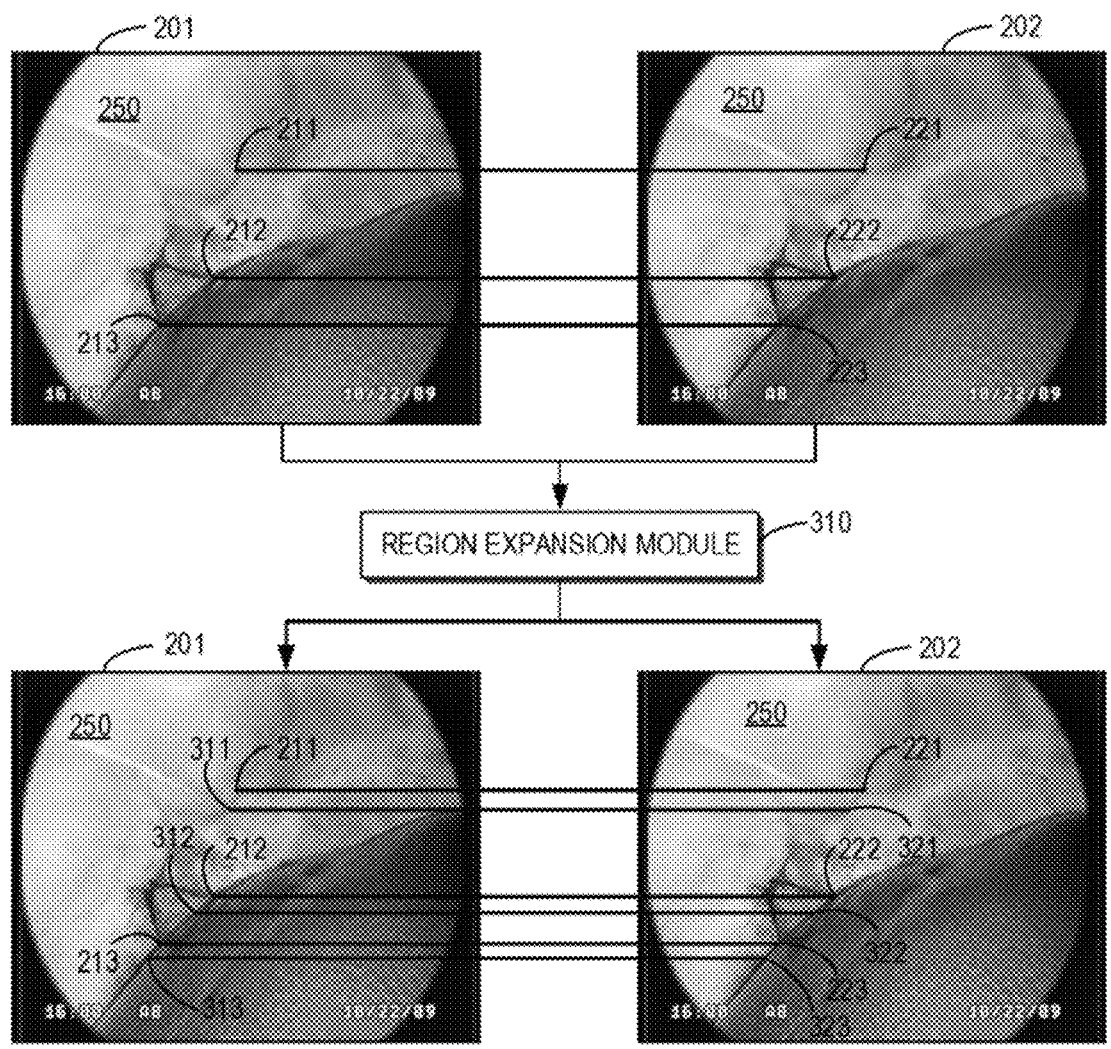
FIG. 3 shows a schematic diagram of feature matching between images according to some embodiments of the present disclosure.

Referring to FIG. 3. In such a embodiment, the sparse reconstruction apparatus 130 may further include a region expansion module 310. The region expansion module 310 may determine more matched pixels based on region affine transformation. Additionally, the region expansion module 310 may also eliminate mismatched pixels from the initially determined matched pixels based on the region affine transformation.

Specifically, the region expansion module 310 may determine an affine transformation between the reference image 201 and the reference image 202 based on the determined matched pixels, and determine more matched pixels based on the affine transformation and the determined matched pixels. For example, the region expansion module 310 may determine, based on the first pixel 211 and the second pixel 221, the affine transformation for a local region near the first pixel 211 and the second pixel 221. Then, the region expansion module 310 may expand outward with the first pixel 211 as the center, so as to determine more pixels or pixel blocks around the first pixel 211 (for example, expand in eight directions). The expanded pixels or pixel blocks may be mapped into the reference image 202 based on the affine transformation, so as to determine corresponding pixels or pixel blocks. Next, the region expansion module 310 may determine new matched pixels or adjust the affine transformation based on whether the expanded pixels in the reference image 201 matches with the corresponding pixels in the reference image 202 according to the image features.

In the example of FIG. 3, a first pixel 311 in the reference image 201 and a second pixel 321 in the reference image 202 are determined as matched pixels. In a similar manner, a first pixel 312 in the reference image 201 and a second pixel 322 in the reference image 202 are determined as matched pixels, and a first pixel 313 in the reference image 201 and a second pixel 323 in the reference image 202 are determined as matched pixels. It can be seen from FIG. 3 that, the number of the matched pixels in the two reference images may be increased by region expansion.

The region expansion module 310 may implement the region affine transformation using any suitable algorithm. In addition, the number of the matched pixels increased using the region affine transformation shown in FIG. 3 is only illustrative, and is not intended to limit the scope of the present disclosure.

Then, the sparse reconstruction apparatus 130 may use the SfM to construct the sparse point cloud 103 by means of the matched pixels (including the matched pixels initially determined by feature matching and the matched pixels increased by region expansion). In addition to the sparse point cloud 103, the sparse reconstruction apparatus 130 may also estimate the postures of the reference camera in capturing the reference image 201 and the reference image 202.

The number and position accuracy of the matched pixels play a crucial role in camera posture estimation and sparse reconstruction. Through the region expansion, more matched pixels may be obtained, and the mismatched pixels may be eliminated. As an example, the matched pixels initially determined by Harris radiation are about 120, and there are more mismatched pixels. After the region expansion, the number of the matched pixels may be increased to about 2600, and the original mismatched pixels may be eliminated. The elimination of the mismatched pixels may improve the accuracy of matching, and may further improve the accuracy of camera posture estimation. The increase in the number of the matched pixels makes the sparse point cloud more abundant to better constrain the training of the depth estimation model 104, which will be described in detail below.

In addition, in the medical field, especially in the use of the endoscope, factors such as rapid movement of the light source, insufficient texture information and low image contrast pose challenges to the matching of feature points in the endoscope image. In this scenario, the feature matching based on local region expansion proposed here may effectively improve the sparse reconstruction.

Example Operation of the Model Training Apparatus

Hereinafter, the operations performed by the model training apparatus 140 shown in FIG. 1A will be further described in detail in conjunction with FIGS. 4A and 4B. The model training apparatus 140 may train the depth estimation model 104 based on the reference image 201 and the reference image 202. Specifically, the model training apparatus 140 may determine constraints for training the depth estimation model 104. Such constraints may include a first constraint related to a difference between different depth maps of the same reference images and a second constraint related to a depth consistency of different reference images. The first constraint may be related to a difference between depth maps with different densities of the same reference images, for example, the first constraint may be a sparse depth loss (SDL) described below. Alternatively, the first constraint may be related to a difference between two or more depth maps of the same reference images, which have the same density but different depth information. For example, such two or more depth maps may be obtained using different methods.

In the case where the depth estimation model 104 is implemented using a neural network, the constraints for training the depth estimation model 104 may be regarded as objective functions or losses for training the depth estimation model 104. As an example, the first constraint may be a sparse depth loss (SDL) related to the difference between depth maps with different densities, and the second loss may be a depth consistency loss (DCL) related to the depth consistency of different images. In the case where the depth estimation model 104 is implemented in other ways, the constraints for training the depth estimation model 104 may be other types of optimization targets. The operations of the model training apparatus 104 are described below by taking an example in which the SDL and the DCL are respectively used as the first constraint and the second constraint.

Figure 4A:
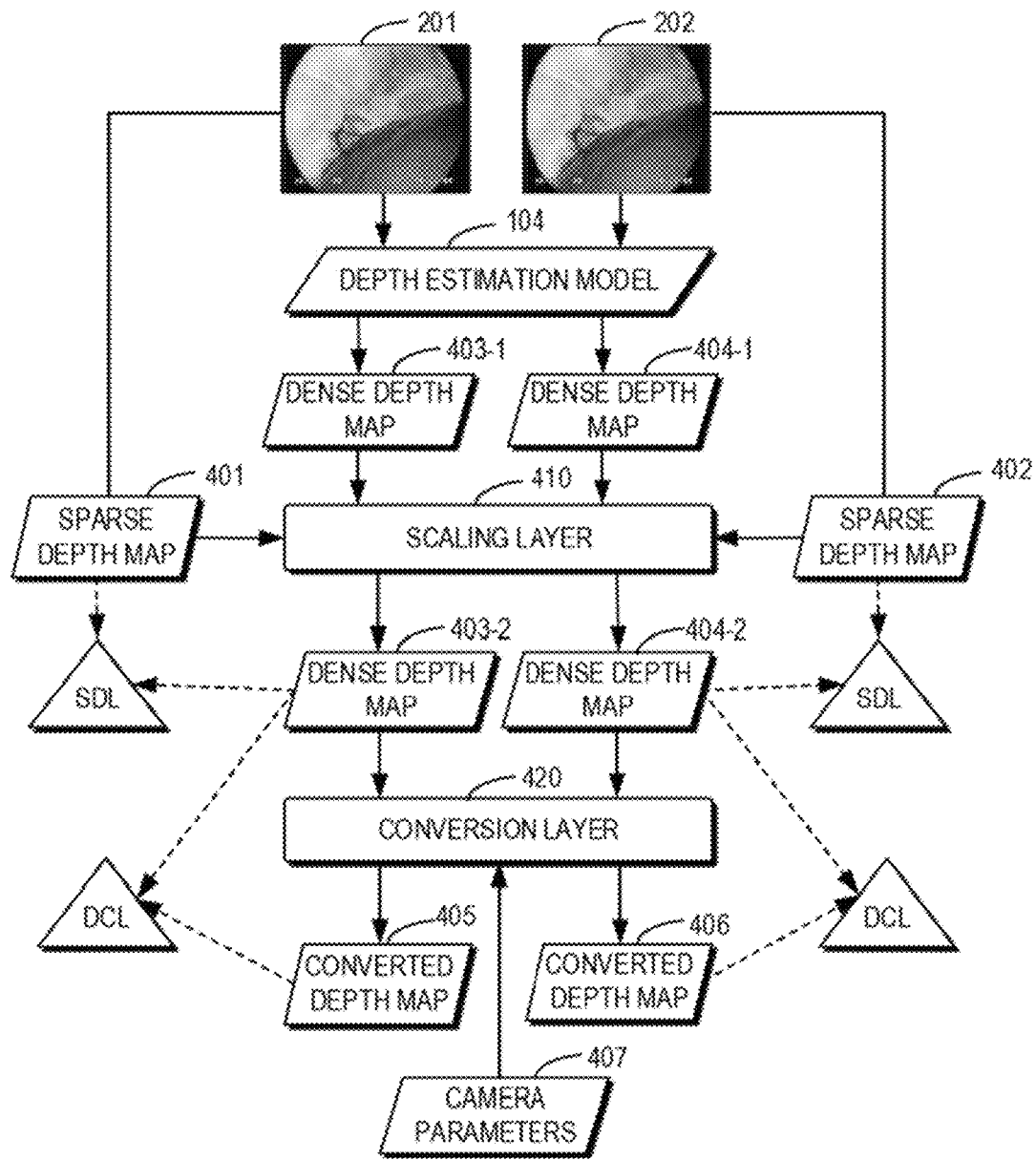
FIG. 4A shows a schematic diagram of training a depth estimation model according to some embodiments of the present disclosure.

As shown in FIG. 4A, the model training apparatus 140 may obtain a sparse depth map 401 corresponding to the reference image 201 and a sparse depth map 402 corresponding to the reference image 202. The model training apparatus 140 may obtain the sparse depth maps in any suitable manner. In some embodiments, the model training apparatus 140 may receive the sparse depth map 401 and the sparse depth map 402 from another apparatus. The other apparatus may be used for, for example, generating the sparse depth map corresponding to a given image in a sequence of images based on the image features of the sequence of images.

In some embodiments, the model training apparatus 140 may generate the sparse depth map 401 and the sparse depth map 402 based on the sparse point cloud 103. Specifically, after the sparse reconstruction apparatus 130 performs the operations described with reference to FIGS. 2 and 3, the sparse point cloud 103 represented by $P_n^w$ may be obtained, wherein w represents a world coordinate system, and n represents the nth point in the sparse point cloud 103. The sparse reconstruction apparatus 130 may also obtain camera posture $R_w^f$ and $T_w^f$ of the reference camera in capturing the reference image 201, wherein f represents the reference image 201, and $R_w^f$ and $T_w^f$ respectively represent rotation and translation from the world coordinate system to a camera coordinate system of the reference image 201. In addition, the sparse reconstruction apparatus 130 may also obtain visibility information $v_n^f$ of a point, which indicates whether the nth point in the sparse point cloud is visible in the reference image 201.

The model training apparatus 140 may generate the sparse depth map 401 and the sparse depth map 402 using the above data obtained by the sparse reconstruction apparatus 130. The sparse depth map is obtained by projecting points in the sparse point cloud onto a specific reference image by means of using coordinate transformation. Taking the sparse depth map 401 corresponding to the reference image 201 as an example, firstly, all the points $P_n^w$ relative to the world coordinate system are transformed into points $P_n^f$ relative to the camera coordinate system, and the transformation may be expressed as:

$$P_n^f = R_w^f P_n^w + T_w^f \quad (1)$$

Then, the depth $d_n^f$ of each point relative to the camera coordinate system of the reference image 201 may be obtained, i.e. a component of $P_n^f$ along a Z axis. Finally, the points $P_n^f$ are projected onto the reference image 201 to obtain 2D coordinates $u_n^f$ of each point, which may be expressed as:

$$u_n^f = K \frac{P_n^w}{d_n^f} \quad (2)$$

Wherein K represents an Eigen matrix of the camera. Therefore, the sparse depth map 401 $D_f^s$ corresponding to the reference image 201 may be expressed as:

$$D_f^s(u_n^f) = \begin{cases} d_n^f & v_n^f = 1 \\ 0 & v_n^f = 0 \end{cases} \quad (3)$$

Wherein s represents that $D_f^s$ is a sparse depth map, and $v_n^f$ represents the visibility information of the above-mentioned points. The value of $v_n^f$ indicates whether to project the nth point onto the reference image 201.

If the reference image 202 is represented by g, the sparse depth map 402 $D_g^s$ corresponding to the reference image 202 may be obtained similarly.

The model training apparatus 140 may train the depth estimation model 104 in a self-supervised manner. As shown in FIG. 4A, based on the reference image 201 and the reference image 202, and according to the depth estimation model 104, a dense depth map 403-1 corresponding to the reference image 201 and a dense depth map 404-1 corresponding to the reference image 202 may be generated. Then, the model training apparatus 140 may further determine the SDL and DCL at least based on a part of the sparse depth map 401, the dense depth map 403-1, the sparse depth map 402, and the dense depth map 404-1.

The determination of the SDL is described below. The model training apparatus 140 may determine the SDL based on the sparse depth map 401, the dense depth map 403-1, the sparse depth map 402, and the dense depth map 404-1. Since the distribution of the dense depth map (for example, the dense depth map 403-1) is inconsistent with the distribution of the corresponding sparse depth map (for example, the sparse depth map 401), in some embodiments, the model training apparatus 140 may scale the range of the corresponding dense depth map according to the range of the sparse depth map, so as to ensure the correctness of subsequent loss calculations.

Specifically, the model training apparatus 140 may determine a scaling factor (also referred to as a "first scaling factor") of the dense depth map 403-1 relative to the sparse depth map 401, and a scaling factor (also referred to as a "second scaling factor") of the dense depth map 404-1 relative to the sparse depth map 402. The model training apparatus 140 may include a scaling layer 410, the scaling layer 410 may scale the dense depth map 403-1 to a dense depth map 403-2 according to the first scaling factor, and scale the dense depth map 404-1 to a dense depth map 404-2 according to the second scaling factor.

As shown in FIG. 4A, the model training apparatus 140 may then determine a difference (also referred to as a "first difference") between the sparse depth map 401 and the dense depth map 403-2, and determine a difference (also referred to as a "second difference") between the sparse depth map 402 and the dense depth map 404-2. The model training apparatus 140 may determine the SDL based on the first difference and the second difference.

Taking the reference image 201 as an example, if the dense depth map 403-1 output by the depth estimation model 104 is expressed by $D_f$, the first scaling factor θ may be expressed as:

$$\theta = \frac{1}{n} \sum_{i=1}^{n} \left( \frac{D_f^s(u_n^f)}{D_f(u_n^f)} \right) \quad (4)$$

The scaled dense depth map 403-2 $\hat{D}_f$ corresponding to the reference image 201 may be expressed as:

$$\hat{D}_f = \theta D_f \quad (5)$$

After the scaling operation, the depth distribution of the sparse depth map 401 is basically consistent with the depth distribution of the scaled dense depth map 403-2. In this way, the correctness of calculating the SDL may be ensured.

Considering that the sparse depth map obtained in the manner described above is considered to be accurate enough to ensure the consistency of the estimated dense depth map, the depth estimation model 104 may be trained with the sparse depth map 401 as a true value, for example, the depth estimation model 104 is trained by minimizing the SDL. A sparse depth loss component $L_{SDL}(f)$ corresponding to the reference image 201 may be expressed as:

$$L_{SDL}(f) = \frac{\sum_{i=1}^{n} \left( D_f^s(u_n^f) - \hat{D}_f(u_n^f) \right)^2}{\sum_{i=1}^{n} \left( \left( D_f^s(u_n^f) \right)^2 + \left( \hat{D}_f(u_n^f) \right)^2 \right)} \quad (6)$$

Since the sparse depth map obtained using methods such as SfM has an arbitrary scale, if the reference images in the sequence image set 102 have different sources, for example, from different monocular endoscope videos, a mean square error (MSE) may produce a relatively large loss value, thereby resulting in overfitting. In the embodiments of the present disclosure, it may be ensured that the loss function has scaling invariance during a training process using the SDL defined in formula (6).

Similar to formulas (4) to (6), a sparse depth loss component $L_{SDL}(g)$ corresponding to the reference image 202 may be determined.

The calculation of the sparse depth loss is described above. It can be understood that, SDL may constrain the local region of the reference images only when sparse depth information exists. However, the sparse depth information actually only covers a small part of the pixels of the reference image. This results in that if only the SDL is considered, most of the pixels in the reference image will not be constrained during the training process. Therefore, it is also necessary to use geometric constraints between the reference images to further ensure the consistency of the corresponding dense depth maps. Correspondingly, the model training apparatus 140 may further train the depth estimation model 104 using the DCL related to the depth consistency of different images.

The model training apparatus 140 may obtain camera parameters 407 from the sparse reconstruction apparatus 130. The camera parameters 407 may include the Eigen matrix K of the reference camera and the postures of the reference camera in capturing the reference image 201 and the reference image 202. The model training apparatus 140 may thus determine the relative posture $R_g^f$ and $T_g^f$ of the reference camera in capturing the reference image 201 and the reference image 202, wherein $R_g^f$ and $T_g^f$ respectively represent the rotation and translation between the camera coordinate system of the reference image 201 and the camera coordinate system of the reference image 202.

The model training apparatus 140 may include a conversion layer 420. The conversion layer 420 may use the relative posture to convert the dense depth map 404-2 into a converted depth map 405 corresponding to the reference image 201, and convert the dense depth map 403-2 into a converted depth map 406 corresponding to the reference image 202. The converted depth map 405 and the converted depth map 406 may be regarded as distorted dense depth maps. Then, the model training apparatus 140 may determine the DCL based on the difference between the dense depth map 403-2 and the converted depth map 405, and the difference between the dense depth map 404-2 and the converted depth map 406.

Specifically, the reference image 201 and the reference image 202 are respectively expressed as f and g, and the scaled dense depth maps 403-2 and 404-2 are respectively expressed as $\hat{D}_f$ and $\hat{D}_g$. A distorted dense depth map $\hat{D}_{f,g}$ from the reference image 201 to the reference image 202 may be obtained by bilinear sampling, i.e. the converted depth map 406 shown in FIG. 4A. First, pixel coordinates $(x_f, y_f)$ in the reference image 201 corresponding to the pixel coordinates $(x_g, y_g)$ of the reference image 202 may be obtained by the following expressions:

$$x_f = \frac{\hat{D}_g(x_g, y_g)(A_{0,0}x_g + A_{0,1}y_g) + B_{0,0}}{\hat{D}_g(x_g, y_g)(A_{2,0}x_g + A_{2,1}y_g) + B_{2,0}} \quad (7)$$

$$y_f = \frac{\hat{D}_g(x_g, y_g)(A_{1,0}x_g + A_{1,1}y_g) + B_{1,0}}{\hat{D}_g(x_g, y_g)(A_{2,0}x_g + A_{2,1}y_g) + B_{2,0}} \quad (8)$$

Wherein, A is a 3×3 matrix $KR_g^fK^{-1}$, and B is a 3×1 matrix $-KT_g^f$.

Then, a new depth value $\tilde{D}_f(x_f, y_f)$ of the pixel $(x_f, y_f)$ in the reference image 201 may be obtained according to formula (9):

$$\tilde{D}_f(x_f, y_f) = \hat{D}_f(x_f, y_f)(C_{2,0}x_f + C_{2,1}y_f) + D_{2,0} \quad (9)$$

Wherein C is a 3×3 matrix $KR_g^fK^{-1}$ and D is a 3×1 matrix $KT_g^f$. The depth value shown in formula (9) represents the depth of the pixel $(x_f, y_f)$ in the case where the pixel $(x_f, y_f)$ is projected onto the reference image 202.

By implementing the aforementioned bilinear sampling on all pixels of the reference image 201, the distorted dense depth map $\hat{D}_{f,g}$ from the reference image 201 to the reference image 202 may be obtained. By implementing similar bilinear sampling on all pixels of the reference image 202, a distorted dense depth map $\hat{D}_{g,f}$ from the reference image 202 to the reference image 201 may be obtained, i.e. the converted depth map 405 shown in FIG. 4A. Finally, the depth consistency loss may be expressed as:

$$L_{DCL}(f, g) = \frac{\sum (\hat{D}_{f,g} - \hat{D}_g)^2}{\sum (\hat{D}_{f,g}^2 + \hat{D}_g^2)} + \frac{\sum (\hat{D}_{g,f} - \hat{D}_f)^2}{\sum (\hat{D}_{g,f}^2 + \hat{D}_f^2)} \quad (10)$$

Wherein Σ represents summation of the calculation results of all pixels of the corresponding images. Similar to $L_{SDL}$, $L_{DCL}$ also has scaling invariance.

In the example of FIG. 4A and the above description, the model training apparatus 140 converts the scaled dense depth map 403-2 and the scaled dense depth map 404-2 into the corresponding converted depth maps, i.e. the distorted dense depth maps. In some other embodiments, the model training apparatus 140 may generate a distorted dense depth map based on the non-scaled dense depth map 403-1 and the non-scaled dense depth map 404-1, and determine the depth consistency loss.

In such a embodiment, a total loss L(f,g) of inputting the reference image 201 and the reference image 202 may be expressed as:

$$L(f,g) = \lambda_1(L_{SDL}(f) + L_{SDL}(g)) + \lambda_2 L_{DCL}(f,g) \quad (11)$$

Wherein $\lambda_1$ and $\lambda_2$ represent weights of the corresponding losses. When the reference images in the sequence image set 102 are sequentially input to the model training apparatus 140, the total loss may be determined correspondingly as shown in formula (11), so as to train the depth estimation model 104.

In some embodiments, in addition to SDL and DCL, the depth estimation model 104 may also be trained using a Photometric Loss (PL) related to the difference between the intensities of different images. The model training apparatus 140 may determine the photometric loss based on the relative posture of the reference camera in capturing the reference image 201 and the reference image 202, the intensity distribution of the reference image 201, and the intensity distribution of the reference image 202.

Specifically, the model training apparatus 140 may convert, on the basis of the relative posture, an intensity map $I_f$ of the reference image 201 into a converted intensity map $I_{f,g}$ corresponding to the reference image 202, i.e. a distorted intensity map. Then, the model training apparatus 140 may calculate the difference between the converted intensity map $I_{fg}$ and the intensity map $I_g$ of the reference image 202 as a part of the photometric loss. When $\hat{D}_{fg}$ mentioned above is obtained, the model training apparatus 140 has determined the pixel $(x_f, y_f)$ in the reference image 201 corresponding to the pixel $(x_g, y_g)$ in the reference image 202. Then, the model training apparatus 140 may directly convert the intensity map $I_f$ of the reference image 201 into the distorted intensity map $I_{fg}$ through bilinear sampling.

Similarly, the intensity map $I_g$ of the reference image 202 may be converted into a distorted intensity map $I_{gf}$ through bilinear sampling. After the distorted intensity map is obtained, the photometric loss $L_{PL}(f,g)$ may be expressed as:

$$L_{PL}(f,g)=\Sigma(\hat{I}_{fg}-\hat{I}_g)^2+\Sigma(\hat{I}_{gf}-\hat{I}_f)^2 \quad (12)$$

Where $\Sigma$ represents summation of the calculation results of all pixels of the corresponding images.

In such an embodiment, the total loss $L(f,g)$ of inputting the reference image 201 and the reference image 202 may be expressed as:

$$L(f,g)=\lambda_1(L_{SDL}(f)+L_{SDL}(g))+\lambda_2 L_{DCL}(f,g)+\lambda_3 L_{PL}(f,g) \quad (13)$$

Wherein $\lambda_1$, $\lambda_2$ and $\lambda_3$ represent weights of the corresponding losses. When the reference images in the sequence image set 102 are sequentially input to the model training apparatus 140, the total loss may be determined correspondingly as shown in formula (13), so as to train the depth estimation model 104.

The depth consistency loss may be used for adjusting the consistency of the dense depth maps of the two reference images. Using the depth consistency loss, the overall structure of the dense depth map estimated by the trained depth prediction model 104 may be more realistic. However, this cannot guarantee the accuracy of depth estimation at locations without sparse depth information constraints. Therefore, in such an embodiment, the accuracy of the estimated depth may be further improved by the added photometric loss.

As mentioned above, in some embodiments, the first constraint may be related to the difference between two or more depth maps of the same reference images, which have the same density but different depth information. FIG. 4B shows a schematic diagram of training the depth estimation models according to some other embodiments of the present disclosure. Only the differences between FIG. 4B and FIG. 4A will be described below.

Figure 4B:
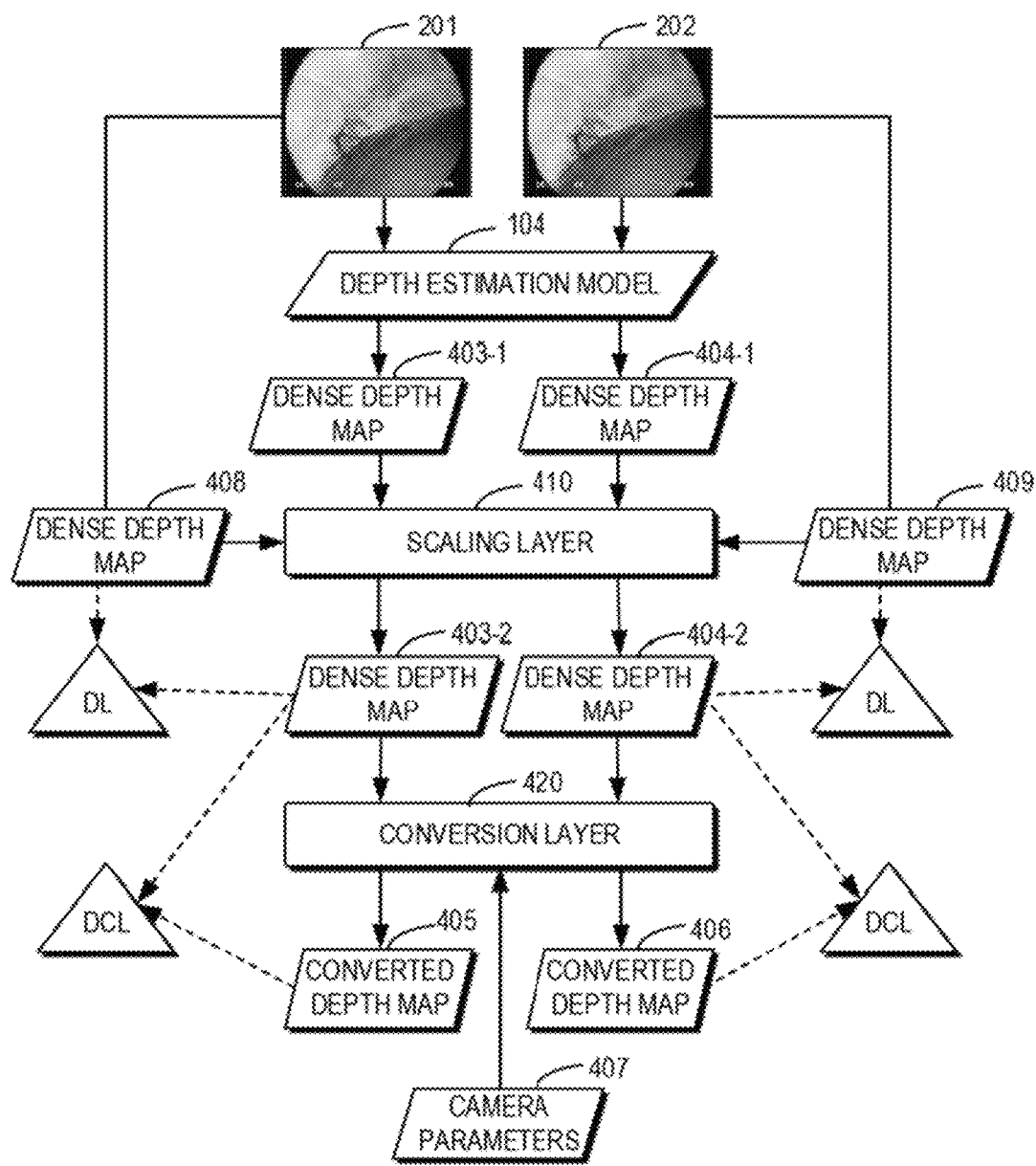
FIG. 4B shows a schematic diagram of training the depth estimation models according to some other embodiments of the present disclosure.

As shown in FIG. 4B, instead of obtaining the sparse depth map 401 and the sparse depth map 402 as shown in FIG. 4A, the model training apparatus 140 may obtain a dense depth map 408 (also referred to as a "third dense depth map") corresponding to the reference image 201, and a dense depth map 409 (also referred to as a "fourth dense depth map") corresponding to the reference image 202. It can be understood that, the dense depth map 408 and the dense depth map 403-1 may have the same density but different depth information. Similarly, the dense depth map 409 and the dense depth map 404-1 may have the same density but different depth information.

The dense depth map 408 and the dense depth map 409 may be obtained in any suitable manner other than the depth estimation model 104. For example, the dense depth map 408 and the dense depth map 409 may be generated using a trained neural network (such as a convolutional neural network CNN). As another example, the dense depth map 408 and the dense depth map 409 may be measured using a sensor.

As shown in FIG. 4B, the model training apparatus 140 may determine, on the basis of the dense depth map 403-1, the dense depth map 408, the dense depth map 404-1 and the dense depth map 409, the first constraint, for example, the shown depth loss (DL). If the depth distribution between the dense depth map 403-1 and the dense depth map 408 is different from the depth distribution between the dense depth map 404-1 and the dense depth map 409, the dense depth map 403-1 and the dense depth map 404-1 may also be scaled using the scaling layer 410, as described with reference to FIG. 4A.

Example Method

Figure 5:
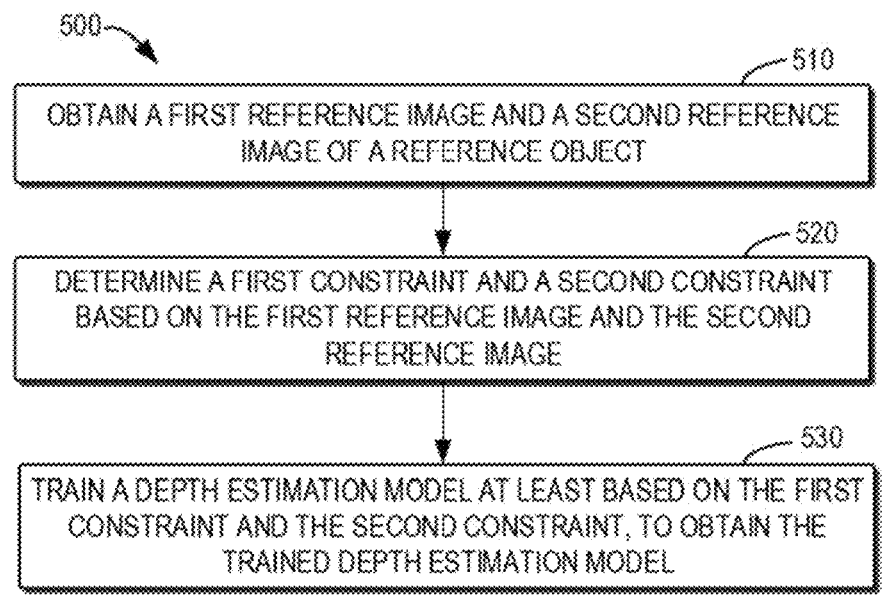
FIG. 5 shows a flow diagram of an example method for image processing according to an embodiment of the present disclosure.

FIG. 5 shows a flow diagram of an example method 500 for image processing according to an embodiment of the present disclosure. For example, the method 500 may be executed by at least a part of the system 100 as shown in FIG. 1A (for example, the model training apparatus 140). The method 500 is described below in conjunction with FIG. 1A to 4B. It should be understood that, the method 500 may also include additional blocks that are not shown and/or some blocks shown may be omitted. The scope of the present disclosure is not limited in this respect.

At block 510, a first reference image (for example, the reference image 201) of a reference object and a second reference image (for example, the reference image 202) of the reference object are obtained. The first reference image and the second reference image are captured by a reference camera at different positions relative to the reference object.

At block 520, a first constraint and a second constraint are determined based on the first reference image and the second reference image. The first constraint is related to a difference between different depth maps of the same reference images, and the second constraint is related to a depth consistency of different reference images.

In some embodiments, in order to determine the first constraint and the second constraint, it is possible to obtain a first dense depth map (for example, the dense depth map 403-1) and a third dense depth map (for example, the dense depth map 408) corresponding to the first reference image, and a second dense depth map (for example, the dense depth map 404-1) and a fourth dense depth map (for example, the dense depth map 409) corresponding to the second reference image. For example, based on the first reference image and the second reference image, and according to the depth estimation model, the first dense depth map and the second dense depth map may be generated. The first dense depth map and the third dense depth map have different depth information, and the second dense depth map and the fourth dense depth map have different depth information. The first constraint may also be determined based on the first dense depth map, the second dense depth map, the third dense depth map and the fourth dense depth map. The second constraint may also be determined based on the first dense depth map and the second dense depth map.

In some embodiments, in order to determine the first constraint and the second constraint, it is possible to obtain a first sparse depth map (for example, the sparse depth map 401) and a first dense depth map (for example, the dense depth map 403-1) corresponding to the first reference image, and a second sparse depth map (for example, the sparse depth map 402) and a second dense depth map (for example, the dense depth map 404-1) corresponding to the second reference image. The first constraint may be determined based on the first sparse depth map, the first dense depth map, the second sparse depth map and the second dense depth map, and the second constraint may be determined based on the first dense depth map and the second dense depth map.

In some embodiments, in order to obtain the first sparse depth map and the second sparse depth map, it is possible to determine a plurality of pairs of pixels based on the image features of the first reference image and the second reference image. Each pair of pixels includes a first pixel (for example, the pixel 211 shown in FIG. 2) in the first reference image, and a second pixel (for example, the pixel 221 shown in FIG. 2) in the second reference image. The second pixel matches with the first pixel according to the image features. It is also possible to construct a point cloud of the reference object at least based on the plurality of pairs of pixels, for example, the sparse point cloud 103 shown in FIG. 1A. The point cloud includes at least multiple points corresponding to the plurality of pairs of pixels, respectively. It is also possible to determine the first sparse depth map based on the point cloud and the posture of the reference camera in capturing the first reference image, and to determine the second sparse depth map based on the point cloud and the posture of the reference camera in capturing the second reference image.

In some embodiments, constructing the point cloud of the reference object may include: determining an affine transformation between the first reference image and the second reference image based on the plurality of pairs of pixels; determining a further plurality of pairs of pixels (for example, the pixel 311 and the pixel 321, the pixel 312 and the pixel 322, and the pixel 313 and the pixel 323 shown in FIG. 3) from the first reference image and the second reference image based on the plurality of pairs of pixels and the affine transformation; and constructing the point cloud based on the plurality of pairs of pixels and the further plurality of pairs of pixels, the point cloud further including multiple points corresponding to the further plurality of pairs of pixels.

In some embodiments, it is possible to determine a first scaling factor of the first dense depth map relative to the first sparse depth map and a second scaling factor of the second dense depth map relative to the second sparse depth map, for example, the scaling factors are determined according to formula (4). It is also possible to determine a first difference between the first sparse depth map and the first dense depth map (for example, the dense depth map 403-2 shown in FIG. 4) that is scaled according to the first scaling factor. It is also possible to determine a second difference between the second sparse depth map and the second dense depth map (for example, the dense depth map 404-2 shown in FIG. 4) that is scaled according to the second scaling factor. It is also possible to determine the first constraint based on the first difference and the second difference.

In some embodiments, it is possible to convert the second dense depth map into a first converted depth map (for example, the converted depth map 405 shown in FIG. 4) corresponding to the first reference image, using the relative posture of the reference camera in capturing the first reference image and the second reference image. It is also possible to convert the first dense depth map into a second converted depth map (for example, the converted depth map 406 shown in FIG. 4) corresponding to the second reference image using the relative posture. It is also possible to determine the second constraint based on a difference between the first dense depth map and the first converted depth map, and a difference between the second dense depth map and the second converted depth map.

In some embodiments, it is possible to convert the scaled second dense depth map (for example, the dense depth map 404-2 shown in FIG. 4) into a first converted depth map (for example, the converted depth map 405 shown in FIG. 4) corresponding to the first reference image, using the relative posture of the reference camera in capturing the first reference image and the second reference image. It is also possible to convert the scaled first dense depth map (for example, the dense depth map 403-2 shown in FIG. 4) into a second converted depth map (for example, the converted depth map 406 shown in FIG. 4) corresponding to the second reference image using the relative posture. It is also possible to determine the second constraint based on a difference between the scaled first dense depth map and the first converted depth map, and a difference between the scaled second dense depth map and the second converted depth map.

At block 530, the depth estimation model is trained at least based on the first constraint (for example, the sparse depth loss) and the second constraint (for example, the depth consistency loss), to obtain the trained depth estimation model.

In some embodiments, a third constraint may be determined based on the relative posture of the reference camera in capturing the first reference image and the second reference image, the intensity distribution of the first reference image, and the intensity distribution of the second reference image. The third constraint is related to a difference between the intensities of different images. For example, the photometric loss may be determined according to formula (12). Then, the depth estimation model 104 may be trained on the basis of the first constraint, the second constraint and the third constraint.

In some embodiments, the first reference image and the second reference image may include at least one of the following: two adjacent frames in a video, or two frames separated by a predetermined number of frames in a video.

In some embodiments, the video may be generated by a monocular endoscope.

Table 1 shows performance comparison of depth estimation models trained with different losses. Table 1 shows that the mean square error between the dense depth map and the sparse depth map output by the depth estimation model are used as an index for performance comparison.

TABLE 1

| Image data | Solution 1 | Solution 2 | Solution 3 |
| --- | --- | --- | --- |
| Solution 1 | 51(±40) | 33(±16) | 30(±17) |
| Solution 2 | 48(±45) | 30(±15) | 25(±16) |
| Solution 3 | 56(±43) | 36(±18) | 32(±20) |

In Table 1, "Solution 1" represents a solution in which only the SDL is used for training the depth estimation model. "Solution 2" represents a solution using a sparse luminous flux loss (SFL) and the DCL. "Solution 3" represents a solution using the SDL and the DCL according to the embodiments of the present disclosure. The experimental data shown in Table 1 may prove that, the solutions according to the embodiments of the present disclosure may effectively improve the performance of the trained depth estimation model.

Figure 6:
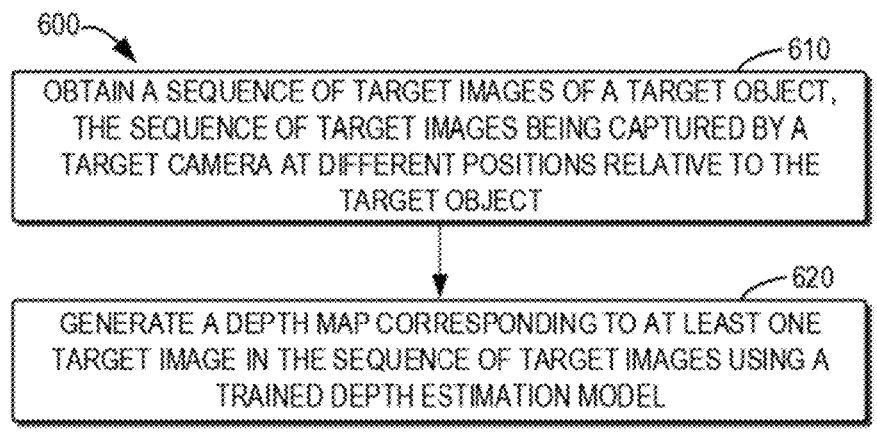
FIG. 6 shows a flow diagram of an example method for image processing according to an embodiment of the present disclosure.

FIG. 6 shows a flow diagram of an example method 600 for image processing according to an embodiment of the present disclosure. For example, the method 600 may be executed by at least a part of the system 100 as shown in FIG. 1A (for example, the model application apparatus 150) or the image processing device 160 as shown in FIG. 1B. It should be understood that, the method 600 may also include additional blocks that are not shown and/or some blocks shown that may be omitted. The scope of the present disclosure is not limited in this respect.

At block 610, a sequence of target images of a target object is obtained, for example, the sequence of target images 105 shown in FIG. 1A. The sequence of target images is captured by a target camera at different positions relative to the target object.

At block 620, a depth map corresponding to at least one target image in the sequence of target images is generated using the trained depth estimation model 104.

In some embodiments, at block 620, a sequence of depth maps corresponding to the sequence of target images may be generated. The method 600 may also include generating a three-dimensional image of the target object based on the sequence of depth maps. In some embodiments, the method 600 may also include recognizing the posture of the target object based on the sequence of depth maps.

Example Device

Figure 7:
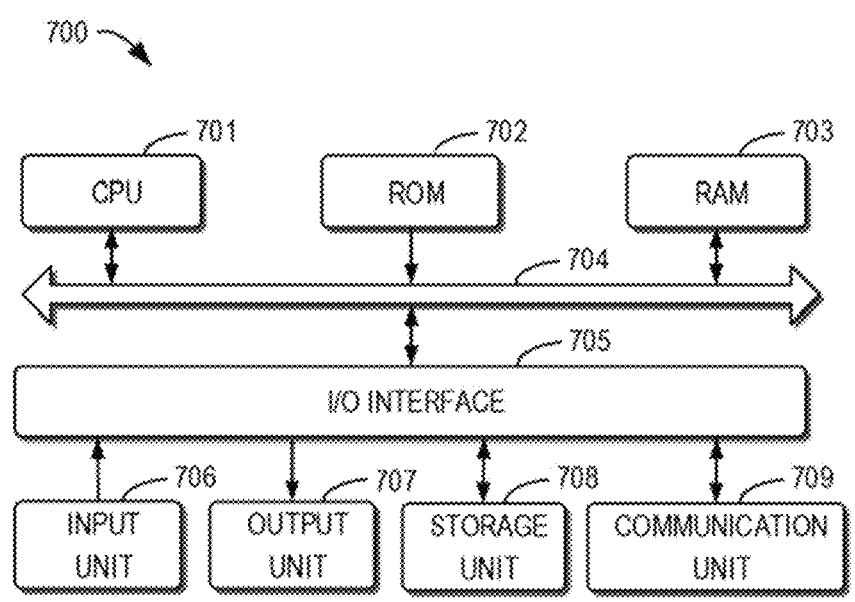
FIG. 7 shows a schematic block diagram of an example computing device that may be used for implementing an embodiment of the present disclosure.

FIG. 7 shows a schematic block diagram of an example computing device 700 that may be used for implementing an embodiment of the present disclosure. For example, one or more apparatuses in the system 100 as shown in FIG. 1A may be implemented by the device 700. As shown in the figure, the device 700 includes a central processing unit (CPU) 701, which may perform various appropriate actions and processing according to computer program instructions stored in a read-only memory (ROM) 702 or computer program instructions loaded from a storage unit 708 into a random access memory (RAM) 703. In the RAM 703, various programs and data required for the operation of the device 700 may also be stored. The CPU 701, the ROM 702 and the RAM 703 are connected to each other through a bus 704. An input/output (I/O) interface 705 is also connected to the bus 704.

A plurality of components in the device 700 are connected to the I/O interface 705, including: an input unit 706, such as a keyboard and a mouse; an output unit 707, such as various types of displays and loudspeakers; a storage unit 708, such as a magnetic disk and an optical disk; and a communication unit 709, such as a network card, a modem and a wireless communication transceiver. The communication unit 709 allows the device 700 to exchange information/data with other devices through computer networks such as the Internet and/or various telecommunication networks.

The processing unit 701 may be configured to perform the various processes and processing described above, such as the methods 500 and 600. For example, in some embodiments, the methods 500 and 600 may be implemented as computer software programs, which are tangibly contained in a machine-readable medium, such as the storage unit 708. In some embodiments, a part or all of the computer programs may be loaded and/or installed on the device 700 via the ROM 702 and/or the communication unit 709. When the computer programs are loaded into the RAM 703 and executed by the CPU 701, one or more steps in the methods 500 and 600 described above may be executed.

In some embodiments, the electronic device includes at least one processing circuit. The at least one processing circuit is configured to: obtain a first reference image and a second reference image of a reference object, wherein the first reference image and the second reference image are captured by a reference camera at different positions relative to the reference object; based on the first reference image and the second reference image, determine a first constraint and a second constraint, wherein the first constraint is related to the difference between different depth maps of the same reference images, and the second constraint is related to the depth consistency of different reference images; and train a depth estimation model at least based on the first constraint and the second constraint, so as to obtain a trained depth estimation model.

In some embodiments, the at least one processing circuit is configured to: obtain a first sparse depth map and a first dense depth map corresponding to the first reference image, and a second sparse depth map and a second dense depth map corresponding to the second reference image; determine the first constraint based on the first sparse depth map, the first dense depth map, the second sparse depth map and the second dense depth map; and determine the second constraint based on the first dense depth map and the second dense depth map.

In some embodiments, the at least one processing circuit is configured to: obtain a first dense depth map and a third dense depth map corresponding to the first reference image, and a second dense depth map and a fourth dense depth map corresponding to the second reference image, wherein the first dense depth map and the third dense depth map have different depth information, and the second dense depth map and the fourth dense depth map have different depth information; determine the first constraint based on the first dense depth map, the second dense depth map, the third dense depth map and the fourth dense depth map; and determine the second constraint based on the first dense depth map and the second dense depth map.

In some embodiments, the at least one processing circuit is configured to: determine multiple pairs of pixels based on the image features of the first reference image and the second reference image, wherein each pair of pixels includes a first pixel in the first reference image and a second pixel in the second reference image, and the second pixel is matched with the first pixel according to the image features; at least based on the plurality of pairs of pixels, construct a point cloud of the reference object, wherein the point cloud includes at least multiple points corresponding to the plurality of pairs of pixels; determine the first sparse depth map based on the point cloud and the posture of the reference camera in capturing the first reference image; and determine the second sparse depth map based on the point cloud and the posture of the reference camera in capturing the second reference image.

In some embodiments, the at least one processing circuit is configured to: based on the plurality of pairs of pixels, determine affine transformation between the first reference image and the second reference image; based on the plurality of pairs of pixels and the affine transformation, determine a further plurality of pairs of pixels from the first reference image and the second reference image; and based on the plurality of pairs of pixels and the further plurality of pairs of pixels, construct the point cloud, wherein the point cloud further includes multiple points corresponding to the further plurality of pairs of pixels.

In some embodiments, the at least one processing circuit is configured to: determine a first scaling factor of the first dense depth map relative to the first sparse depth map and a second scaling factor of the second dense depth map relative to the second sparse depth map; determine a first difference between the first sparse depth map and the first dense depth map that is scaled according to the first scaling factor; determine a second difference between the second sparse depth map and the second dense depth map that is scaled according to the second scaling factor; and determine the first constraint based on the first difference and the second difference.

In some embodiments, the at least one processing circuit is configured to: convert the second dense depth map into a first converted depth map corresponding to the first reference image using the relative posture of the reference camera in capturing the first reference image and the second reference image; convert the first dense depth map into a second converted depth map corresponding to the second reference image using the relative posture; and determine the second constraint based on the difference between the first dense depth map and the first converted depth map, and the difference between the second dense depth map and the second converted depth map.

In some embodiments, the at least one processing circuit is configured to: determine a third constraint based on the relative posture of the reference camera in capturing the first reference image and the second reference image, the intensity distribution of the first reference image, and the intensity distribution of the second reference image, wherein the third constraint is related to the difference between the intensities of different reference images; and train the depth estimation model based on the first constraint, the second constraint and the third constraint.

In some embodiments, the first reference image and the second reference image include at least one of the following: two adjacent frames in a video, or two frames separated by a predetermined number of frames in the video.

In some embodiments, the video is generated by a monocular endoscope.

In some embodiments, the computing device includes: at least one processing circuit. The at least one processing circuit is configured to: obtain a sequence of target images of a target object, wherein the sequence of target images is captured by a target camera at different positions relative to the target object; and use the depth estimation model trained using the method according to any one of claims 1-8 to generate a depth map corresponding to at least one target image in the sequence of target images.

In some embodiments, the at least one processing circuit is configured to: generate a sequence of depth maps corresponding to the sequence of target images, and the at least one processing circuit is further configured to: generate a three-dimensional image of the target object at least based on the sequence of dense depth maps and the internal parameters of the target camera.

The present disclosure may be implemented as a system, a method and/or a computer program product. When the present disclosure is implemented as a system, in addition to being implemented on a single device, the components described herein may also be implemented in the form of a cloud computing architecture. In a cloud computing environment, these components may be remotely arranged and may work together to implement the functions described in the present disclosure. Cloud computing may provide computing, software, data access and storage services, and they do not require terminal users to know the physical locations or configurations of systems or hardware that provide these services. The cloud computing may provide services over a wide area network (such as the Internet) using appropriate protocols. For example, cloud computing providers provide applications through the wide area network, and they may be accessed through a browser or any other computing components. Cloud computing components and corresponding data may be stored on a remote server. Computing resources in the cloud computing environment may be merged at a remote data center location, or these computing resources may be dispersed. Cloud computing infrastructure may provide services through a shared data center, even if they appear to be a single access point for users. Therefore, various functions described herein may be provided from a remote service provider using the cloud computing architecture. Alternatively, they may be provided from a conventional server, or they may be installed on a client device directly or in other ways. In addition, the present disclosure may also be implemented as a computer program product, and the computer program product may include a computer-readable storage medium on which computer-readable program instructions for executing various aspects of the present disclosure are loaded.

The computer-readable storage medium may be a tangible device that may hold and store instructions used by an instruction execution device. The computer-readable storage medium may be, for example, but is not limited to, an electrical storage device, a magnetic storage device, an optical storage device, an electromagnetic storage device, a semiconductor storage device, or any suitable combination of the above devices. A more specific example (a non-exhaustive list) of the computer-readable storage medium includes: a portable computer disk, a hard disk, a random access memory (RAM), a read-only memory (ROM), an erasable programmable read-only memory (EPROM or a flash memory), a static random access memory (SRAM), a portable compact disk read-only memory (CD-ROM), a digital versatile disk (DVD), a memory stick, a floppy disk, a mechanical encoding device, such as a protruding structure in a punch card or a groove on which instructions are stored, and any suitable combination of the above devices. The computer-readable storage medium used herein is not interpreted as a transient signal itself, such as radio waves or other freely propagating electromagnetic waves, electromagnetic waves propagating through waveguides or other transmission media (for example, light pulses transmitted via optical fiber cables), or electrical signals transmitted via electric wires.

The computer-readable program instructions described herein may be downloaded from the computer-readable storage medium into various computing/processing devices, or downloaded into an external computer or external storage device via a network, such as the Internet, a local area network, a wide area network, and/or a wireless network. The network may include a copper transmission cable, optical fiber transmission, wireless transmission, a router, a firewall, a switch, a gateway computer, and/or an edge server. A network adapter card or network interface in each computing/processing device receives the computer-readable program instructions from the network, and forwards the computer-readable program instructions for storage in the computer-readable storage medium in each computing/processing device.

The computer program instructions used for executing the operations of the present disclosure may be assembly instructions, instruction set architecture (ISA) instructions, machine instructions, machine-related instructions, microcodes, firmware instructions, state setting data, or source codes or target codes compiled in any combination of one or more programming languages, the programming languages include object-oriented programming languages such as Smalltalk and C++, and conventional procedural programming languages such as a "C" language or similar programming languages. The computer-readable program instructions may be completely executed on a user computer, partly executed on the user computer, executed as a stand-alone software package, partly executed on the user computer and partly executed on a remote computer, or completely executed on a remote computer or a server. In the case where the remote computer is involved, the remote computer may be connected to the user computer through any kind of networks, including a local area network (LAN) or a wide area network (WAN), or, it may be connected to an external computer (for example, connected via the Internet using an Internet service provider). In some embodiments, an electronic circuit, such as a programmable logic circuit, a field programmable gate array (FPGA) or a programmable logic array (PLA), may be customized using the state information of the computer-readable program instructions. The electronic circuit may execute the computer-readable program instructions to implement various aspects of the present disclosure.

Here, the various aspects of the present disclosure are described with reference to flow diagrams and/or block diagrams of the method, the apparatus (system) and the computer program product according to the embodiments of the present disclosure. It should be understood that, each block of the flow diagrams and/or the block diagrams and combinations of blocks in the flow diagrams and/or the block diagrams may be implemented by the computer-readable program instructions.

These computer-readable program instructions may be provided for a general-purpose computer, a special-purpose computer or processing units of other programmable data processing apparatuses, so as to generate a machine, such that these instructions, when executed by the computers or the processing units of the other programmable data processing apparatuses, generate apparatuses used for implementing specified functions/actions in one or more blocks of the flow diagrams and/or the block diagrams. These computer-readable program instructions may also be stored in the computer-readable storage medium, these instructions cause the computers, the programmable data processing apparatuses and/or other devices to work in particular manners, such that the computer-readable storage medium storing the instructions includes a manufacture, which includes instructions for implementing the various aspects of the specified functions/actions in one or more blocks of the flow diagrams and/or the block diagrams.

These computer-readable program instructions may also be loaded on the computers, the other programmable data processing apparatuses or the other devices, so as to execute a series of operation steps on the computers, the other programmable data processing apparatuses or the other devices to produce processes implemented by the computers, such that the instructions executed on the computers, the other programmable data processing apparatuses or the other devices implement the specified functions/actions in one or more blocks of the flow diagrams and/or the block diagrams.

The flow diagrams and the block diagrams in the drawings show system architectures, functions and operations that may be implemented by the system, the method and the computer program product according to a plurality of embodiments of the present disclosure. In this regard, each block in the flow diagrams and the block diagrams may represent a part of a module, a program segment or an instruction, and the part of the module, the program segment or the instruction contains one or more executable instructions for implementing specified logical functions. In some alternative implementations, the functions marked in the blocks may also occur in a different order from the order marked in the drawings. For example, two consecutive blocks may actually be executed substantially in parallel, or they may sometimes be executed in a reverse order, depending on the functions involved. It should also be noted that, each block in the block diagrams and/or the flow diagrams, and the combination of the blocks in the block diagrams and/or the flow diagrams may be implemented by a dedicated hardware-based system which is used for executing the specified functions or actions, or it may be implemented by a combination of dedicated hardware and computer instructions.

The various embodiments of the present disclosure have been described above, and the above description is exemplary, not exhaustive, and is not limited to the various disclosed embodiments. Without departing from the scope and spirit of the various described embodiments, many modifications and changes are obvious to those of ordinary skill in the art. The choice of the terms used herein is intended to best explain the principles of various embodiments, practical applications, or improvements to the technology in the market, or to enable other ordinary skilled in the art to understand the various embodiments disclosed herein.

What is claimed is:

1. An image processing method, comprising:
    obtaining a first reference image and a second reference image of a reference object, the first reference image and the second reference image being captured by a reference camera at different positions relative to the reference object;
    determining a first constraint and a second constraint based on the first reference image and the second reference image, the first constraint being related to a difference between different depth maps of the same reference images, and the second constraint being related to depth consistency of different reference images; and
    training a depth estimation model at least based on the first constraint and the second constraint, to obtain the trained depth estimation model,
    wherein determining the first constraint and the second constraint comprises:
    obtaining a first sparse depth map and a first dense depth map corresponding to the first reference image, and a second sparse depth map and a second dense depth map corresponding to the second reference image;
    determining the first constraint based on the first sparse depth map, the first dense depth map, the second sparse depth map and the second dense depth map; and
    determining the second constraint based on the first dense depth map and the second dense depth map.

2. The method of claim 1, wherein determining the first constraint and the second constraint comprises:
    obtaining a first dense depth map and a third dense depth map corresponding to the first reference image, and a second dense depth map and a fourth dense depth map corresponding to the second reference image, the first dense depth map and the third dense depth map having different depth information, and the second dense depth map and the fourth dense depth map having different depth information;
    determining the first constraint based on the first dense depth map, the second dense depth map, the third dense depth map and the fourth dense depth map; and
    determining the second constraint based on the first dense depth map and the second dense depth map.

3. The method of claim 1, wherein obtaining the first sparse depth map and the second sparse depth map comprises:

determining a plurality of pairs of pixels based on image features of the first reference image and the second reference image, each pair of pixels comprising a first pixel in the first reference image and a second pixel in the second reference image that matches with the first pixel according to the image features;

constructing a point cloud of the reference object at least based on the plurality of pairs of pixels, the point cloud comprising at least a plurality of points corresponding to the plurality of pairs of pixels, respectively;

determining the first sparse depth map based on the point cloud and a posture of the reference camera in capturing the first reference image; and determining the second sparse depth map based on the point cloud and a posture of the reference camera in capturing the second reference image.

4. The method of claim 3, wherein constructing the point cloud of the reference object comprises:

determining an affine transformation between the first reference image and the second reference image based on the plurality of pairs of pixels;

determining a further plurality of pairs of pixels from the first reference image and the second reference image based on the plurality of pairs of pixels and the affine transformation; and constructing the point cloud based on the plurality of pairs of pixels and the further plurality of pairs of pixels, the point cloud further comprising a plurality of points corresponding to the further plurality of pairs of pixels.

5. The method of claim 1, wherein determining the first constraint based on the first sparse depth map, the first dense depth map, the second sparse depth map and the second dense depth map comprises:

determining a first scaling factor of the first dense depth map relative to the first sparse depth map and a second scaling factor of the second dense depth map relative to the second sparse depth map;

determining a first difference between the first sparse depth map and the first dense depth map that is scaled according to the first scaling factor;

determining a second difference between the second sparse depth map and the second dense depth map that is scaled according to the second scaling factor; and determining the first constraint based on the first difference and the second difference.

6. The method of claim 1, wherein determining the second constraint based on the first dense depth map and the second dense depth map comprises:

converting the second dense depth map into a first converted depth map corresponding to the first reference image using a relative posture of the reference camera in capturing the first reference image and the second reference image;

converting the first dense depth map into a second converted depth map corresponding to the second reference image using the relative posture; and determining the second constraint based on a difference between the first dense depth map and the first converted depth map and a difference between the second dense depth map and the second converted depth map.

7. The method of claim 1, wherein training the depth estimation model at least based on the first constraint and the second constraint comprises:

determining a third constraint based on a relative posture of the reference camera in capturing the first reference image and the second reference image, an intensity distribution of the first reference image, and an intensity distribution of the second reference image, the third constraint being related to a difference between intensities of different reference images; and training the depth estimation model based on the first constraint, the second constraint and the third constraint.

8. The method of claim 1, wherein the first reference image and the second reference image comprise at least one of the following:

two adjacent frames in a video, or two frames separated by a predetermined number of frames in a video.

9. The method of claim 8, wherein the video is generated by a monocular endoscope.

10. The device of claim 1, wherein the at least one processing circuit is configured to:

determine a plurality of pairs of pixels based on image features of the first reference image and the second reference image, each pair of pixels comprising a first pixel in the first reference image and a second pixel in the second reference image that matches with the first pixel according to the image features;

construct a point cloud of the reference object at least based on the plurality of pairs of pixels, the point cloud comprising at least a plurality of points corresponding to the plurality of pairs of pixels, respectively;

determine the first sparse depth map based on the point cloud and a posture of the reference camera in capturing the first reference image; and determine the second sparse depth map based on the point cloud and a posture of the reference camera in capturing the second reference image.

11. The device of claim 10, wherein the at least one processing circuit is configured to:

determine an affine transformation between the first reference image and the second reference image based on the plurality of pairs of pixels;

determine a further plurality of pairs of pixels from the first reference image and the second reference image based on the plurality of pairs of pixels and the affine transformation; and construct the point cloud based on the plurality of pairs of pixels and the further plurality of pairs of pixels, the point cloud further comprising a plurality of points corresponding to the further plurality of pairs of pixels.

12. An electronic device, comprising:

at least one processing circuit configured to:

obtain a first reference image and a second reference image of a reference object, the first reference image and the second reference image being captured by a reference camera at different positions relative to the reference object;

determine a first constraint and a second constraint based on the first reference image and the second reference image, the first constraint being related to a difference between different depth maps of the same reference images, and the second constraint being related to depth consistency of different reference images;

train a depth estimation model at least based on the first constraint and the second constraint, to obtain the trained depth estimation model, obtain a first sparse depth map and a first dense depth map corresponding to the first reference image, and a second sparse depth map and a second dense depth map corresponding to the second reference image;

determine the first constraint based on the first sparse depth map, the first dense depth map, the second sparse depth map and the second dense depth map; and determine the second constraint based on the first dense depth map and the second dense depth map.

13. The device of claim 12, wherein the at least one processing circuit is configured to:

obtain a first dense depth map and a third dense depth map corresponding to the first reference image, and a second dense depth map and a fourth dense depth map corresponding to the second reference image, the first dense depth map and the third dense depth map having different depth information, and the second dense depth map and the fourth dense depth map having different depth information;

determine the first constraint based on the first dense depth map, the second dense depth map, the third dense depth map and the fourth dense depth map; and determine the second constraint based on the first dense depth map and the second dense depth map.

14. The device of claim 12, wherein the at least one processing circuit is configured to:

determine a first scaling factor of the first dense depth map relative to the first sparse depth map and a second scaling factor of the second dense depth map relative to the second sparse depth map;

determine a first difference between the first sparse depth map and the first dense depth map that is scaled according to the first scaling factor;

determine a second difference between the second sparse depth map and the second dense depth map that is scaled according to the second scaling factor; and determine the first constraint based on the first difference and the second difference.

15. The device of claim 12, wherein the at least one processing circuit is configured to:

convert the second dense depth map into a first converted depth map corresponding to the first reference image using a relative posture of the reference camera capturing the first reference image and the second reference image;

convert the first dense depth map into a second converted depth map corresponding to the second reference image using the relative posture; and determine the second constraint based on a difference between the first dense depth map and the first converted depth map and a difference between the second dense depth map and the second converted depth map.

16. The device of claim 12, wherein the at least one processing circuit is configured to:

determine a third constraint based on a relative posture of the reference camera in capturing the first reference image and the second reference image, an intensity distribution of the first reference image, and an intensity distribution of the second reference image, the third constraint being related to a difference between intensities of different reference images; and train the depth estimation model based on the first constraint, the second constraint and the third constraint.

17. A computer-readable storage medium having machine-executable instructions stored thereon, the machine-executable instructions, when executed by a device, causing the device to:

obtain a first reference image and a second reference image of a reference object, the first reference image and the second reference image being captured by a reference camera at different positions relative to the reference object;

determine a first constraint and a second constraint based on the first reference image and the second reference image, the first constraint being related to a difference between different depth maps of the same reference images, and the second constraint being related to depth consistency of different reference images;

train a depth estimation model at least based on the first constraint and the second constraint, to obtain the trained depth estimation model;

obtain a first sparse depth map and a first dense depth map corresponding to the first reference image, and a second sparse depth map and a second dense depth map corresponding to the second reference image;

determine the first constraint based on the first sparse depth map, the first dense depth map, the second sparse depth map and the second dense depth map; and determine the second constraint based on the first dense depth map and the second dense depth map.

* * * * *